United States Patent
Beringer

(10) Patent No.: US 8,327,293 B2
(45) Date of Patent: Dec. 4, 2012

(54) METHODS, COMPUTER SYSTEMS, AND COMPUTER PROGRAM PRODUCTS FOR OUTPUTTING DATA AT A USER-INTERFACE IN A COMPUTER SYSTEM

(75) Inventor: Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 303 days.

(21) Appl. No.: 10/935,191

(22) Filed: Sep. 8, 2004

(65) Prior Publication Data
US 2005/0138030 A1    Jun. 23, 2005

(30) Foreign Application Priority Data

Sep. 8, 2003    (EP) .................................... 03077834
Dec. 11, 2003    (EP) .................................... 03078924

(51) Int. Cl.
*G06F 3/048*    (2006.01)
(52) U.S. Cl. ......................... 715/853; 715/738; 715/733
(58) Field of Classification Search .................. 715/853, 715/738, 733
See application file for complete search history.

(56) References Cited

U.S. PATENT DOCUMENTS

| 5,589,892 | A | 12/1996 | Knee et al. | |
| 5,684,525 | A | 11/1997 | Klosterman | |
| 6,308,164 | B1 * | 10/2001 | Nummelin et al. | 705/9 |
| 7,240,288 | B2 * | 7/2007 | Allor et al. | 715/736 |

FOREIGN PATENT DOCUMENTS
GB    2 379 289 A    3/2003

OTHER PUBLICATIONS

Microsoft, Microsoft Project for Windows Feature Guide: Business Project Planning System, 1990, Version 1.0 Windows Series, pp. 7, 26.*
EPO communication pursuant to Art. 97(2) EPC for EP 03 078 924.2 dated Jul. 31, 2009.

* cited by examiner

*Primary Examiner* — Andrey Belousov
(74) *Attorney, Agent, or Firm* — Finnegan, Henderson, Farabow, Garrett & Dunner LLP

(57) ABSTRACT

Methods, systems and computer program products are provided for outputting data at, for example, a user-interface in a computer system. According to one aspect, a method may be provided that comprises receiving categorized data at the user-interface based on data from each of at least two computer programs. The categorized data may be categorized into at least two data categories. At the user-interface, data from the at least two computer programs which is categorized in one category is represented together, and separate from data categorized in another category.

14 Claims, 1 Drawing Sheet

Unification based on Cognitive Meta Data

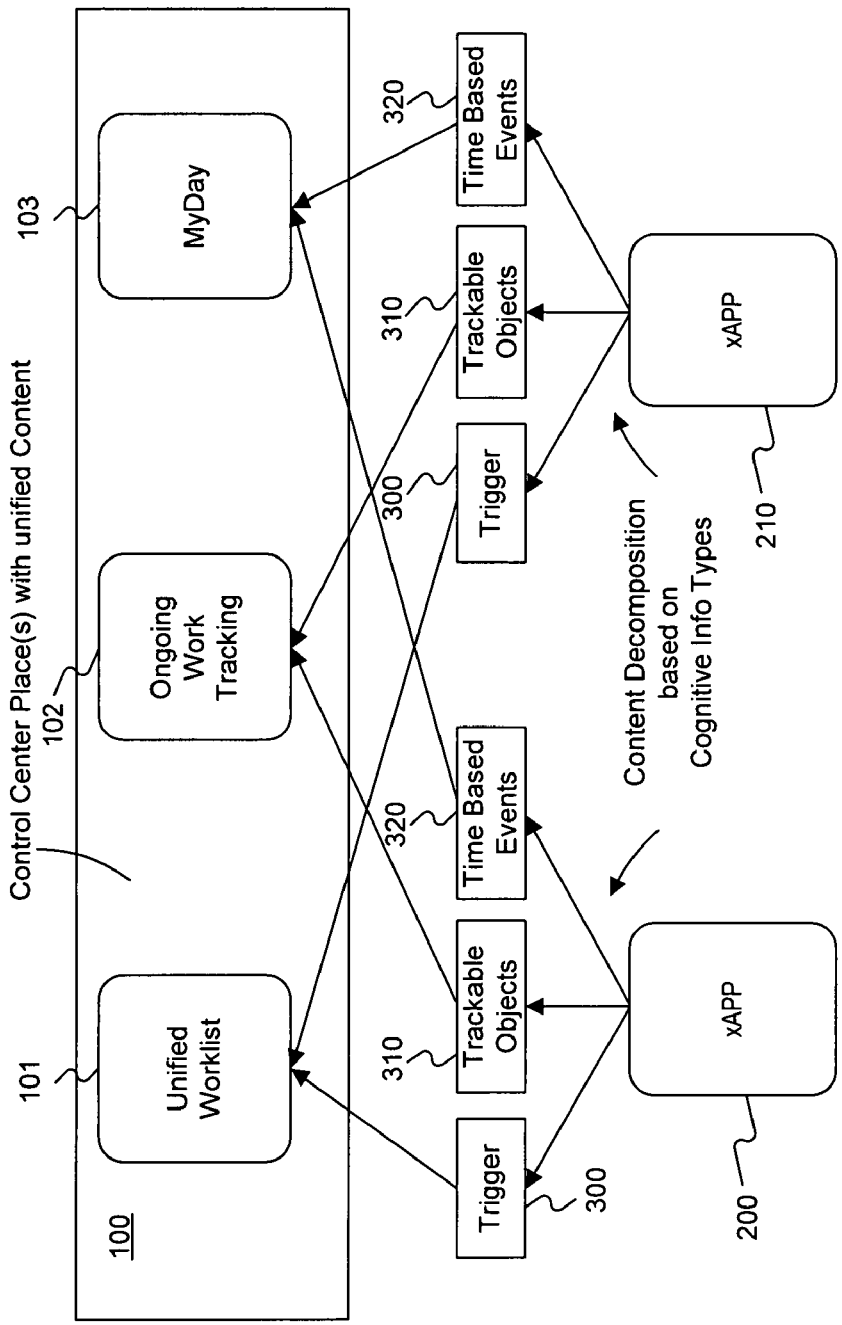

METHODS, COMPUTER SYSTEMS, AND COMPUTER PROGRAM PRODUCTS FOR OUTPUTTING DATA AT A USER-INTERFACE IN A COMPUTER SYSTEM

BACKGROUND

I. Field of the Invention

The present invention generally relates to methods and systems for outputting data in a computer system. More particularly, the invention relates to methods, computer systems, and computer program products for categorizing and outputting data at, for example, a user-interface in a computer system or a client system.

II. Background Information

In a computer system, several applications or computer programs may be running simultaneously. It is known to represent those running programs or parts of the running programs simultaneously to, for example, a user at a user-interface. For example, in the Microsoft Windows® operating system, when running different programs, for each program a separate window may be present in a graphical user-interface (GUI), in which window a part of the respective program is represented. Thus, a user can perceive several programs simultaneously at a single user-interface.

Also, in relation to computer systems running an enterprise resource system, role based integration platforms are known. In a role based integration platform, information may be presented to a user at the user-interface from different programs running simultaneously, but the presented information is typically limited to information which is related to the role of a user in the enterprise. Thus, only information relevant to the user is presented and less redundant information may or may not be presented.

One drawback of these known methods and systems is that still separate programs are represented at the user-interface. Thus, a user has to absorb information from each program separately and then merge the information from the different programs. For role based integration platforms, a user receives only information relevant to his/her role, but since the information is represented in different programs, it is difficult to understand, inter alia, his/her role, the status of the work, and what to do next. Accordingly, known systems and methods have a low ease of use.

SUMMARY OF THE INVENTION

Consistent with embodiments of the present invention, methods and systems are provided for outputting data in a computer system with an increased ease of use. Embodiments of the invention further relate to methods, computer systems, and computer program products for categorizing and outputting data at, for example, a user-interface in a computer system or a client system.

In accordance with one embodiment, a method is provided for outputting data at a user-interface in a computer system, the method comprising: receiving categorized data at the user-interface from each of at least two computer programs, the categorized data being categorized into at least two data categories; and representing data from at least two computer programs at the user-interface which is categorized in one category together, and separate from data categorized in another category.

In the exemplary method, an increased ease of use may be achieved because information from different programs, but categorized in the same data category, is presented together. Therefore, a user does not have to process the data from different programs to integrate the information. Accordingly, the ease of use may be increased.

In accordance with another embodiment, a system is provided that comprises: one or more processor devices arranged for running at least two computer programs; a categorizing device for categorizing the data originating from the at least two computer programs into at least two data categories; and a user-interface communicatively connected to the one or more processor devices and the categorizing device, the user-interface comprising at least two sub-interfaces each arranged for representing data categorized in one category from the at least two computer programs together, and separately from data categorized in another category.

According to yet another embodiment, a client-system is provided that comprises a user-interface which is communicatively connectable to at least one server system for receiving data from at least two running computer programs, the data being categorized in at least two categories. The user-interface may comprise at least two sub-interfaces each arranged for representing data from at least two computer programs which is categorized in one category together, and separate from data categorized in another category.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 1 is a diagram of a computer system, consistent with an embodiment of the present invention.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 illustrates an exemplary computer system 1, consistent with an embodiment of the invention. As shown in FIG. 1, computer system 1 may include a user-interface (UI) 100 at which information can be outputted in a human-perceptible-form. At the UI 100, computer programs or parts of computer programs running on the computer system 1 can be represented as, for example, audio, graphics or otherwise. In one example, the UI may comprise a graphical user-interface (GUI) at a display device. Of course, as will be appreciated by those skilled in the art, the UI may likewise comprise other types of interfaces.

In the computer system 1, one or more computer programs may be running, such as computer programs "xApp" 200 and 210. In the example of FIG. 1, two computer applications or computer programs 200, 210 are running on the computer system 1. However, the number of running programs may likewise be different. Furthermore, the computer programs may be running simultaneously on a single processor or may likewise be running on separate processors.

The computer system 1 may comprise any suitable programmable device, such as a single computer device, such as a desktop computer or a personal digital assistant (PDA). However, the computer system 1 may likewise comprise two or more separate computer devices which are connected by means of a data communication network. The computer programs 200, 210 may then, for example, be running on separate server devices which are communicatively connected to a client computer which comprises the user-interface 100.

At the user-interface 100, for example, a web-browser program may be graphically represented as a web-browser user-interface. The web-browser program may allows access to resources, such as programs, data and services of a computerized enterprise management system, such as that sold by SAP AG of Walldorf, Germany. In such a case, sub-interfaces 101, 102 and 103 may be represented in the web-browser user-interface, for instance, as data fields, tables, or otherwise.

In the example of FIG. 1, computer programs 200,210 are communicatively connected to one another via categorizing devices 300, 310, and 320. The computer programs 200,210 can output data to the UI 100 and receive data from the UI. The GUI 100 comprises sub-interfaces 101, 102 and 103 where data generated by means of the computer programs 200,210 is outputted.

As indicated by arrows in FIG. 1, data generated by means of the computer programs 200,210 may be transmitted from the computer programs 200,210 to the user-interface 100 via the categorizing devices 300,310,320. The categorizing devices 300,310,320 may decompose or organize the data from the programs 200, 210 into different categories. By way of example, the data may be organized into cognitive information type categories. Each of the categorizing devices 300, 310,320 may be connected to a different one of the sub-interfaces 101,102,103. Further, each of the categorizing devices 300,310,320 may transmit the data categorized in one category to a respective sub-interface connected thereto.

Thus, in each sub-interface 101,102,103 data originating from different computer programs, but categorized in the same category, is represented. Each sub-interface 101,102, 103 may organize and present the categorized data using window(s), table(s), list(s) and/or other screen objects or elements. Accordingly, the ease of use is increased because several programs may be running on the computer system while a user is presented related information from different programs in a single user-interface.

Furthermore, consistent with an embodiment of the invention, the computer programs interacting with the user-interface can be changed in a simple manner, because the data from the computer programs is categorized. Thus, for instance, other computer programs may be added without the necessity of adapting the user-interface, because the data from the computer programs is categorized and the data categories already have a sub-interface in the user-interface.

In FIG. 1, two sets of similar categorizing devices are present and each of the programs 200,210 is connected to a different set of categorizing devices. The streams of data from the programs 200,210 are categorized separately by one of the sets of categorizers. The streams of data from the computer programs 200,210 categorized in the same category are merged at the user-interface and information about the specific computer program which generated data can therefore be obtained at the user-interface. However, the computer programs may likewise use the same set of categorizing devices. In such case, if information about the origin of data is desired at the user-interface, data can be added to the categorized data about the data's origin.

Because information about the origin of the data is present at the user-interface, additional functionality may be implemented in the computer system 1. For instance, in one embodiment, interaction between the user and the separate computer programs is possible. Accordingly, data can for example be inputted at the user-interface and transmitted to a specific computer program in response to the representation of data at the user-interface. However, other features using the information may likewise be used.

The categorizing devices 300,310,320 may be implemented as a framework of resources which can be used by the programs 200,201 to categorize the data. For example, the framework may comprise a memory in which object classes, personalized repositories, UI patterns and/or other resources are stored, which can be accessed and used by the programs 200,201 to provide data in the desired categories and transmit the data to a suitable sub-interface 101,102,103.

Depending on the type of data, the resources available in the framework may be different. For some types of data (e.g., trigger, trackable objects, time based events) the framework may for example comprise a memory with a central repository in which the computer programs 200,201 can register their objects. The framework may then be provided with a delivery mechanism (e.g., universal inbox) or UI patterns to display data about the objects stored in the repository at the UI. For other types of data, for example, a central application may be provided which performs a query in all active roles of a user and dynamically builds pages or link lists of services of a specific type across roles at the user interface.

The embodiment of FIG. 1 may be particularly suited for, but not necessarily limited to, an implementation in an enterprise resource system. The categorizing devices 300,310,320 may categorize the data in user-centric categories that correspond to cognitive archetype-like information classes, such as how people work in general and what the basic issues are, independent of the concrete subject matter or the role of the user in an enterprise. For example, that people want to observe and monitor their work, that there exist triggers that require an action by the user, that complex tasks are broken down into sub-tasks and steps, and that people have to decide what to do next based on urgency and relevance. By way of further example, in FIG. 1, the categorizing devices 300,310, 320 divide the data from the computer programs 200,210 into the categories: 'work trigger', 'trackable objects', and 'time based events'.

Categorizing in such categories, including the categories in the example of FIG. 1, can provide a distinction between data (and accordingly allows a representation thereof in the sub-interfaces 101-103) which can be processed quickly by a user and accordingly increases the ease of use of the computer system 1.

In one embodiment, the work trigger category may comprises data in response to which the user has to start a certain task, for example, hire new personnel, book a flight or otherwise. The data in the work trigger category may also comprise data to which the user has to respond to initiate performing certain steps by the computer system, for example, cleaning up a hard-disk or otherwise. In the example of FIG. 1, the data in the work trigger category is represented in the sub-interface 101, the "Unified Worklist."

Consistent with another embodiment, all new tasks imposed by the different programs may be represented in the same sub-interface and the user can easily grasp all new tasks. As a result, the user can easily determine which tasks are to be performed according to the different programs. Optionally, the user may use information from the other sub-interfaces, for instance, to determine which task has priority.

In another embodiment, the trackable objects category may comprise data relating to the status of ongoing tasks and processes, such as for example at what phase a project is currently in or if a budget is still in the expected range. The data in the trackable objects category may be represented in the sub-interface 102, "Ongoing Work Tracking."

Consistent with another aspect, the status of ongoing tasks and projects from different programs may be represented in the same sub-interface and the user may receive an overview of the status of different projects and tasks or otherwise. Thereby, the user can be informed quickly about the status of projects or tasks processed by different computer programs and, for instance, determine priorities.

According to one embodiment, the time-based events category may comprise data relating to events which happen at a certain time-moment, such as a deadline, appointments or otherwise. The data in the time based events category may be represented in the sub-interface 103, "MyDay."

The time based events from different programs may be represented in the same sub-interface and the user may receive a non-complicated overview of the status of the different time limits imposed on him/her. Thereby, process security may be increased as well, since the user can easily determine possible conflicts between events from different programs.

The computational aspects described herein can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor. Further, method steps can be performed by a programmable processor executing a program of instructions to perform functions by operating on input data and generating output.

Embodiments of the invention may also be implemented in an article of manufacture with a computer usable medium having computer readable instructions embodied therein for providing access to resources available on that computer, the computer readable instructions comprising instructions to cause the computer to perform a part of a method. Embodiments of the invention may also be implemented as a computer program for running on a computer system, at least including code portions for performing steps of a method when run on a computer system or enabling a general propose computer system to perform functions of a filter or categorizing device. Such a computer program may be provided on a data carrier, such as a CD-ROM or diskette, stored with data loadable in a memory of a computer system, the data representing the computer program. The data carrier may further include a data connection, such as a telephone cable or a wireless connection transmitting signals representing a computer program, consistent with embodiments of the invention.

As used herein, the term "comprising" does not exclude the presence of other elements or steps than those listed in, for example, a claim. Further, the term "a" is used as an equivalent of "one or more" or "at least one."

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for outputting data at a user-interface in a computer system, the method comprising:
   categorizing data generated from at least two computer programs into at least two categories, wherein the data is categorized based on an information type of the data;
   receiving the categorized data at the user-interface while the computer programs are running simultaneously;
   merging, at the user-interface, streams of data from the categorized data categorized in the same category;
   presenting, at the user-interface, at least a first set of the categorized data which is in a first category of the at least two categories and a second set of the categorized data which is in a second category of the at least two categories;
   collecting data entered through the user-interface, the collected data being entered for transmission to origins of the sets of the categorized data, wherein the origins of the sets of categorized data corresponds to at least one of the at least two computer programs; and
   transmitting, using at least one processor, the collected data to at least one of the computer programs that corresponds to the respective origin for the set of the categorized data.

2. A method as claimed in claim 1, further comprising:
   receiving, through the user-interface, input associated with a part of the categorized data, wherein the part of the categorized data is presented at the user-interface with an origin for the part; and
   transmitting the input to one of the computer programs based on the origin for the part.

3. A method as claimed in claim 1, wherein the at least two categories comprise a trigger category, the trigger category comprising data representing information about tasks to be performed.

4. A method as claimed in claim 1, wherein the at least two categories comprise a trackable objects category, the trackable objects category comprising data representing information about ongoing work.

5. A method as claimed in claim 1, wherein the at least two categories comprise a time-based events category, the time-based events category comprising data representing information about events to happen at a time-moment.

6. A method as claimed in claim 1, wherein the method is performed in a client-server system, the client-server system comprising at least one server system communicatively connected to at least one client system, and further wherein the at least two computer programs are running on one or more server systems and the user-interface is present at a client system.

7. A method as claimed in claim 1, further comprising categorizing data from at least one of the computer programs separately from data from other computer programs.

8. A computer system comprising a non-transitory computer-readable storage medium with computer readable instructions embodied therein, a processor executing the instructions stored in the computer readable storage medium to perform steps of a method for outputting data at a user-interface in a computer system, the method comprising:
   categorizing data generated from at least two computer programs into at least two categories, wherein the data is categorized based on an information type of the data;
   receiving the categorized data at the user-interface while the computer programs are running simultaneously;
   merging, at the user-interface, streams of data from the categorized data categorized in the same category;
   presenting, at the user-interface, at least a first set of the categorized data which is in a first category of the at least two categories and a second set of the categorized data which is in a second category of the at least two categories;
   collecting data entered through the user-interface, the collected data being entered for transmission to origins of the sets of the categorized data, wherein the origins of the sets of categorized data corresponds to at least one of the at least two computer programs; and
   transmitting the collected data to at least one of the computer programs that corresponds to the respective origin for the set of the categorized data.

9. The computer system of claim 8, the system further comprising:
   receiving, through the user-interface, input associated with a part of the categorized data, wherein the part of the categorized data is presented at the user-interface with an origin for the part; and
   transmitting the input to one of the computer programs based on the origin for the part.

10. The computer system of claim 8, wherein the at least two categories comprise a trigger category, the trigger category comprising data representing information about tasks to be performed.

11. The computer system of claim 8, wherein the at least two categories comprise a trackable objects category, the trackable objects category comprising data representing information about ongoing work.

12. The computer system of claim 8, wherein the at least two categories comprise a time-based events category, the time-based events category comprising data representing information about events to happen at a time-moment.

13. The computer system of claim 8, wherein the method is performed in a client-server system, the client-server system comprising at least one server system communicatively connected to at least one client system, and further wherein the at least two computer programs are running on one or more server systems and the user-interface is present at a client system.

14. The computer system of claim 8, the system further comprising:
   categorizing data from at least one of the computer programs separately from data from other computer programs.

* * * * *